US008330441B1

(12) United States Patent
Klumpp

(10) Patent No.: US 8,330,441 B1
(45) Date of Patent: Dec. 11, 2012

(54) TECHNIQUE FOR REDUCING CROSSTALK INTERFERENCE BETWEEN INTEGRATED SWITCHING REGULATORS

(75) Inventor: Thatcher D. Klumpp, Tucson, AZ (US)

(73) Assignee: National Semiconductor Corporation, Santa Clara, CA (US)

( * ) Notice: Subject to any disclaimer, the term of this patent is extended or adjusted under 35 U.S.C. 154(b) by 366 days.

(21) Appl. No.: 12/657,630

(22) Filed: Jan. 25, 2010

(51) Int. Cl.
*G05F 1/44* (2006.01)
(52) U.S. Cl. .................................. 323/282
(58) Field of Classification Search .......... 323/267, 323/272, 273, 282, 351
See application file for complete search history.

(56) References Cited

U.S. PATENT DOCUMENTS

| | | | |
|---|---|---|---|
| 5,659,208 A | 8/1997 | Kimble et al. | |
| 6,150,803 A * | 11/2000 | Varga | 323/282 |
| 6,437,548 B2 * | 8/2002 | Aas et al. | 323/272 |
| 6,476,589 B2 * | 11/2002 | Umminger et al. | 323/282 |
| 6,774,611 B2 * | 8/2004 | Umminger et al. | 323/282 |
| 7,019,497 B2 * | 3/2006 | Umminger et al. | 323/220 |
| 7,075,346 B1 | 7/2006 | Hariman et al. | |
| 7,235,958 B2 * | 6/2007 | Brassfield et al. | 323/282 |
| 7,528,586 B2 * | 5/2009 | Jiang | 323/282 |
| 7,759,916 B2 * | 7/2010 | Kleveland | 323/268 |
| 7,888,926 B2 * | 2/2011 | Ishino | 323/284 |
| 8,134,353 B2 * | 3/2012 | Chen et al. | 323/275 |
| 2006/0125451 A1 * | 6/2006 | Tabaian et al. | 323/222 |

OTHER PUBLICATIONS

"Standalone Linear Li-Ion Battery Charger and Dual Synchronous Buck Converter", Linear Technology Corporation, 2006, 20 pages.
"Fast 2-Phase, No Rsense Buck Controller with Output Tracking", Linear Technology Corporation, 2003, 32 pages.
"LM2642, Two-Phase Synchronous Step-Down Switching Controller", National Semiconductor Corporation, Feb. 2006, 21 pages.
"LM22678, 5A Simple Switcher®, Step-Down Voltage Regulator with Precision Enable", National Semiconductor Corporation, Dec. 18, 2009, 16 pages.
"LH1605 Switching Regulator", National Semiconductor Corporation, Sep. 1983, 10 pages.
"LM2853, 3A 550 kHz Synchronous Simple Switcher® Buck Regulator", National Semiconductor Corporation, Oct. 2006, 12 pages.
"LM26400Y, Dual 2A, 500kHz Wide Input Range Buck Regulator", National Semiconductor Corporation, Aug. 2007, 24 pages.

* cited by examiner

*Primary Examiner* — Adolf Berhane
(74) *Attorney, Agent, or Firm* — Andrew S. Viger; Wade J. Brady, III; Frederick J. Telecky, Jr.

(57) ABSTRACT

An apparatus includes multiple switching regulators configured to generate at least one regulated output signal. The apparatus also includes a combination unit configured to blank the switching regulators in response to a switching event associated with one or more of the switching regulators. Each switching regulator could include a one shot timer configured to generate a first signal having pulses that identify switching events associated with that switching regulator. The combination unit may be configured to combine the first signals to generate at least one second signal, which can be provided to blanking inputs of the switching regulators. The combination unit could include one or more logical OR gates configured to combine the pulses in the first signals. The one shot timer in each switching regulator could generate a pulse in the first signal in response to each rising and falling edge of a control signal in that switching regulator.

20 Claims, 3 Drawing Sheets

TECHNIQUE FOR REDUCING CROSSTALK INTERFERENCE BETWEEN INTEGRATED SWITCHING REGULATORS

TECHNICAL FIELD

This disclosure relates generally to switching regulators. More specifically, this disclosure relates to a technique for reducing crosstalk interference between integrated switching regulators.

BACKGROUND

Many systems use switching regulators or "switchers" to generate regulated voltages for use by other components of the systems. For example, a buck or step-down regulator generates an output voltage $V_{OUT}$ that is lower than its input voltage $V_{IN}$. A boost or step-up regulator generates an output voltage $V_{OUT}$ that is higher than its input voltage $V_{IN}$.

Some systems use a single switcher to generate a regulated voltage. During a switching event in the switcher, a switch can be turned on, which may generate extreme noise and other interference. To help avoid problems, control circuitry in the switcher can be temporarily put on hold or "blanked" until conditions settle and return to normal. This is done to avoid erroneous or false triggers of switching control signals.

Other systems use multiple switchers, each of which can generate a regulated voltage. However, control circuitry in one switcher may be polluted during a switching event in the other switcher, even if the switchers are independent of one another. This interfering cross-communication is often referred to as "crosstalk" interference. Layout techniques and bondwire orientation of integrated circuit designs are typically used to address crosstalk interference.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

FIGS. 1 through 4, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
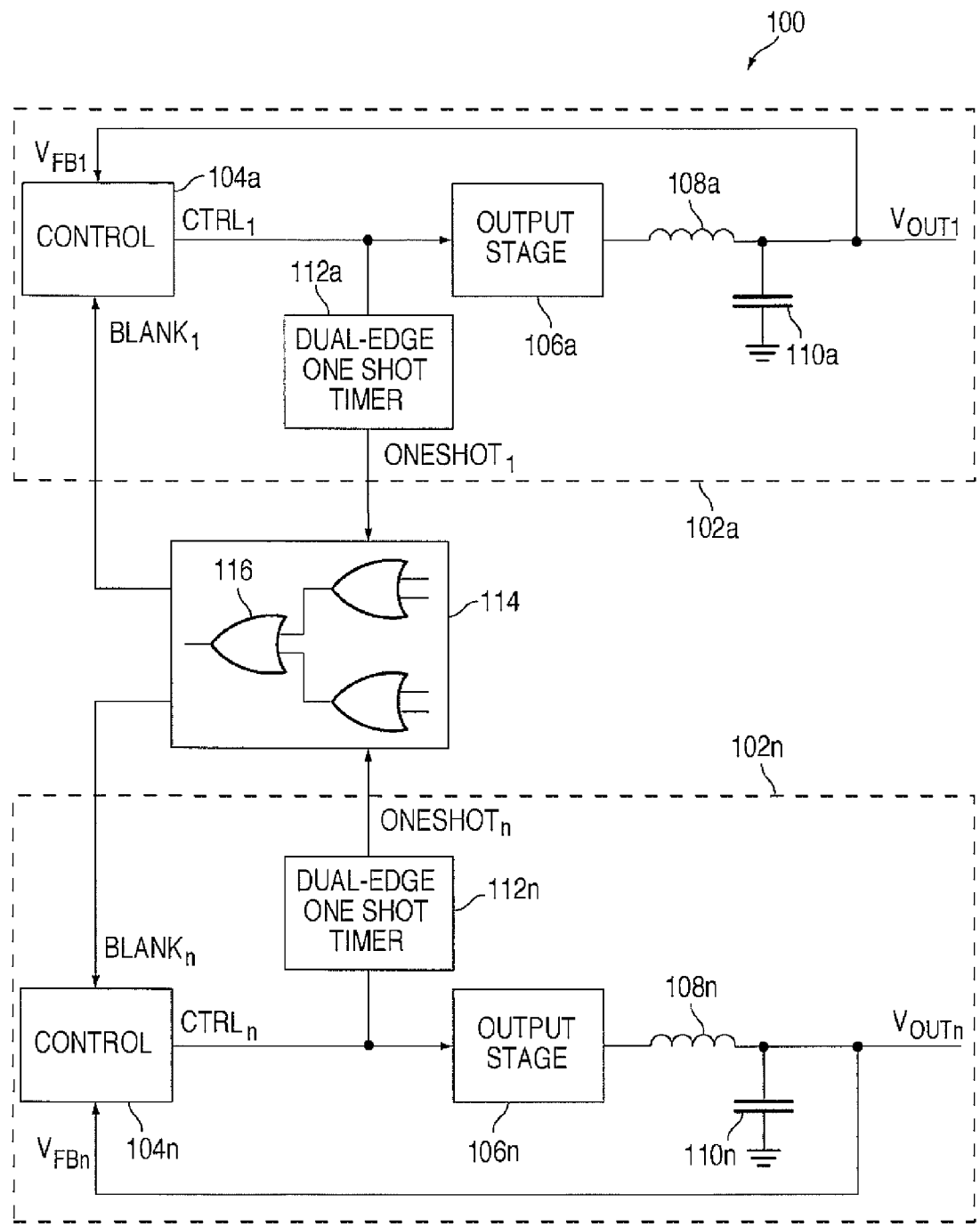
FIG. 1 illustrates an example circuit for reducing crosstalk interference between integrated switching regulators according to this disclosure.

FIG. 1 illustrates an example circuit 100 for reducing crosstalk interference between integrated switching regulators according to this disclosure. As shown in FIG. 1, the circuit 100 includes two or more switching regulators 102a-102n. Each switching regulator 102a-102n operates to generate a regulated output signal. In this example, the switching regulators 102a-102n generate regulated output voltages $V_{OUT1}$-$V_{OUTn}$, each of which could be provided to one or more loads. However, the switching regulators 102a-102n could be placed in any other suitable configuration. For instance, at least two of the switching regulators 102a-102n could be coupled to the same load and be used to collectively generate a regulated output signal for that load. Each switching regulator 102a-102n includes any suitable structure for generating a regulated output signal. As particular examples, each switching regulator 102a-102n could represent a buck converter, a boost converter, a buck-boost converter, a single ended primary inductor converter (SEPIC), or a flyback converter.

In this example, each switching regulator 102a-102n includes a control unit 104a-104n, an output stage 106a-106n, an inductor 108a-108n, and a capacitor 110a-110n. Each control unit 104a-104n generates a control signal $CTRL_1$-$CTRL_n$ for controlling operation of its corresponding output stage 106a-106n. Each output stage 106a-106n generates a regulated signal that is provided to its corresponding inductor 108a-108n and capacitor 110a-110n, which generate and filter a regulated output signal (a regulated output voltage $V_{OUT1}$-$V_{OUTn}$ here). As a particular example, each output stage 106a-106n could include one or more switches, and each control unit 104a-104n could generate a control signal $CTRL_1$-$CTRL_n$ for turning the switch(es) in its corresponding output stage on and off. Each control unit 104a-104n can use a feedback signal $V_{FB1}$-$V_{FBn}$ to determine how to control its corresponding output stage 106a-106n.

Each control unit 104a-104n includes any suitable structure for controlling one or more switches or other components in an output stage. Each output stage 106a-106n includes any suitable structure for generating a regulated signal, such as a regulated output voltage. Each inductor 108a-108n includes any suitable inductive structure having any suitable inductance. Each capacitor 110a-110n includes any suitable capacitive structure having any suitable capacitance.

Each switching regulator 102a-102n also includes a dual-edge one shot timer 112a-112n. Each one shot timer 112a-112n receives the control signal $CTRL_1$-$CTRL_n$ output by its corresponding control unit 104a-104n. Each one shot timer 112a-112n also generates a short pulse in an output signal $ONESHOT_1$-$ONESHOT_n$ in response to each rising and falling edge in the received control signal. Each one shot timer 112a-112n includes any suitable structure for generating a pulse in an output signal based on an input signal.

When one of the control units 104a-104n turns one or more switches in its corresponding output stage 106a-106n on or off, this is called a "switching event." A switching event in one switching regulator 102a-102n can cause noise or other interference in other switching regulators 102a-102n. This noise or other interference could, for example, cause a control unit to prematurely end a pulse in its control signal.

In accordance with this disclosure, a pulse in any of the $ONESHOT_1$-$ONESHOT_n$ signals is used to "blank" the control units 104a-104n. In this example, the circuit 100 includes a combination unit 114, which combines the $ONESHOT_1$-$ONESHOT_n$ signals to generate one or more blanking signals $BLANK_1$-$BLANK_n$. Each of the $BLANK_1$-$BLANK_n$ signals contains pulses from the $ONESHOT_1$-$ONESHOT_n$ signals. The blanking signals $BLANK_1$-$BLANK_n$ are provided to the control units 104a-104n, each of which is temporarily put on hold or "blanked" in response to a pulse in its corresponding blanking signal.

The combination unit 114 includes any suitable structure for combining multiple signals. In this example, the combination unit 114 includes one or more logical OR gates 116. The number and arrangement of the OR gates 116 may vary depending on the circumstances. For example, when two switching regulators are used in the circuit 100, the combination unit 114 could include a single two-input OR gate 116. When three switching regulators are used in the circuit 100, the combination unit 114 could include a single three-input OR gate 116. If four switching regulators are used in the circuit 100, the combination unit 114 could include two two-input OR gates 116 (each coupled to two of the four regulators), plus a third two-input OR gate 116 coupled to the first two OR gates 116. Any other or additional logic could be used to combine pulses in multiple input signals.

By combining the outputs of the one shot timers 112a-112n, the combination unit 114 can help to blank the control units 104a-104n in response to a switching event in any of the switching regulators 102a-102n. In this way, each control unit 104a-104n is blanked in response to switching events in its own output stage 106a-106n and in response to switching events in other output stages 106a-106n. This can help to reduce or eliminate crosstalk interference between the switching regulators 102a-102n.

In particular embodiments, the circuit 100 (or a large portion of the circuit 100) could be implemented on a single integrated circuit chip. For example, the control units 104a-104n, output stages 106a-106n, and one shot timers 112a-112n of the switching regulators 102a-102n and the combination unit 114 could be implemented on a single integrated circuit chip. Depending on the implementation, the inductors 108a-108n and/or the capacitors 110a-110n may or may not be integrated on the integrated circuit chip.

Although FIG. 1 illustrates one example of a circuit 100 for reducing crosstalk interference between integrated switching regulators, various changes may be made to FIG. 1. For example, the circuit 100 could include any number of switching regulators 102a-102n. Also, the combination unit 114 could combine signals from the one shot timers 112a-112n in any suitable manner. Further, the combination unit 114 is shown as generating multiple blanking signals BLANK$_1$-BLANK$_n$, one for each control unit 104a-104n. In other embodiments, a single blanking signal can be generated and provided to multiple control units or to all control units. In addition, while all switching regulators 102a-102n are shown as being blanked by signals from the combination unit 114, the circuit 100 could include one or more additional switching regulators that are not blanked by the combination unit 114. An additional switching regulator could be blanked, for instance, in response only to its own switching events.

Figure 2:
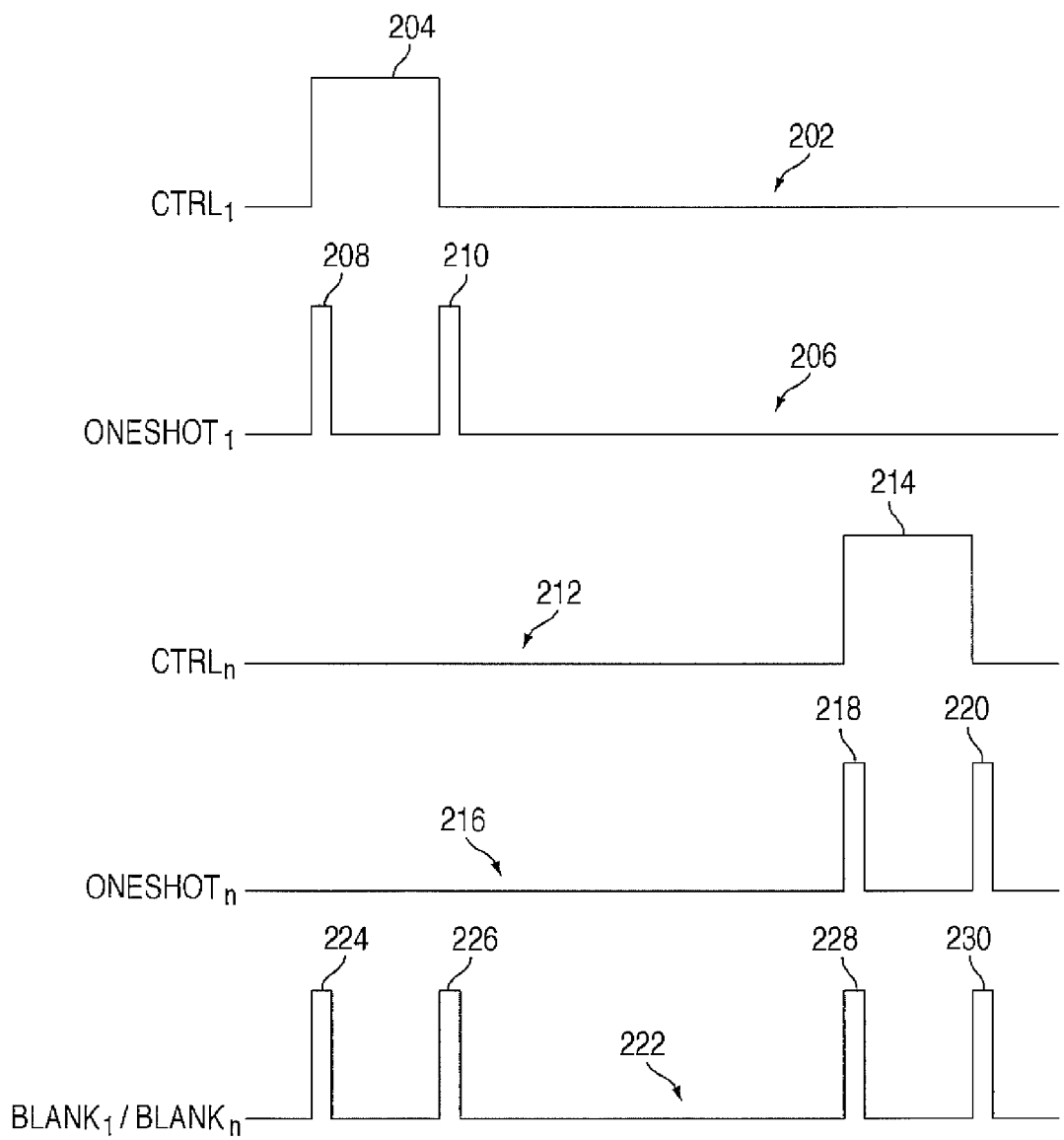
FIG. 2 illustrates example waveforms in the circuit of FIG. 1 according to this disclosure.

FIG. 2 illustrates example waveforms in the circuit 100 of FIG. 1 according to this disclosure. As shown in FIG. 2, a signal 202 represents an example CTRL$_1$ signal that could be generated by the control unit 104a in FIG. 1. The signal 202 includes a pulse 204, which indicates that the control unit 104a is attempting to turn one or more switches in the output stage 106a on or off (depending on the configuration of the output stage 106a). This pulse therefore represents two switching events in the output stage 106a. The first switching event occurs when the signal 202 goes high at the beginning of the pulse 204. The second switching event occurs when the signal 202 goes low at the end of the pulse 204.

A signal 206 represents an example ONESHOT$_1$ signal that could be generated by the one shot timer 112a in FIG. 1. The signal 206 includes a short pulse 208 that is generated in response to the rising edge of the pulse 204. The signal 206 also includes a short pulse 210 that is generated in response to the falling edge of the pulse 204.

A signal 212 represents an example CTRL$_n$ signal that could be generated by the control unit 104n in FIG. 1. The signal 212 includes a pulse 214, which indicates that the control unit 104n is attempting to turn one or more switches in the output stage 106n on or off (depending on the configuration of the output stage 106n). A signal 216 represents an example ONESHOT$_n$ signal that could be generated by the one shot timer 112n in FIG. 1. The signal 216 includes a short pulse 218 that is generated in response to the rising edge of the pulse 214. The signal 216 also includes a short pulse 220 that is generated in response to the falling edge of the pulse 214.

To support the blanking of the control units 104a-104n in response to a pulse in any of the one shot signals ONESHOT$_1$-ONESHOT$_n$, the combination unit 114 generates at least one blanking signal 222. The signal 222 represents the one or more blanking signals BLANK$_1$-BLANK$_n$. The blanking signal 222 includes pulses 224-230, which correspond to the pulses 208-210 in the signal 206 and to the pulses 218-220 in the signal 216. The blanking signal 222 can be provided to the "blanking" inputs of the control units 104a-104n. As a result, the control units 104a-104n can be blanked in response to each switching event in any of the output stages 106a-106n.

Although FIG. 2 illustrates examples of waveforms in the circuit 100 of FIG. 1, various changes may be made to FIG. 2. For example, while pulses in the waveforms in FIG. 2 are shown as going from a low logical level to a high logical level and then back to the low logical level, the signals in FIG. 2 could be inverted. Also, the signals shown in FIG. 2 could vary. For instance, pulses in the signals 202 and 212 could overlap.

Figure 3:
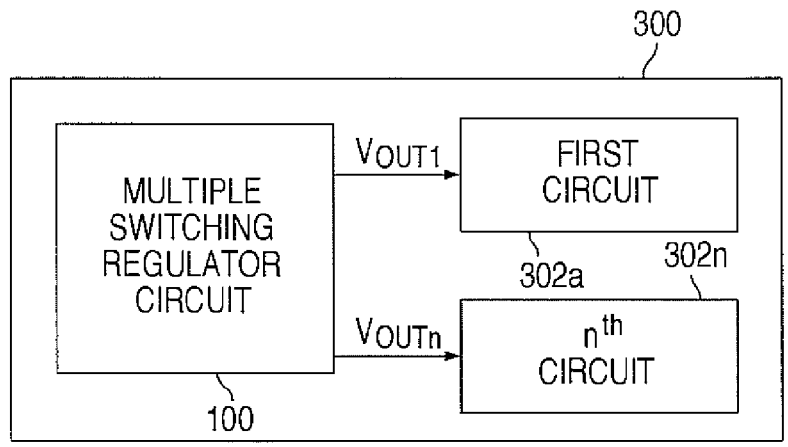
FIG. 3 illustrates an example system including a circuit for reducing crosstalk interference between integrated switching regulators according to this disclosure.

FIG. 3 illustrates an example system 300 including a circuit for reducing crosstalk interference between integrated switching regulators according to this disclosure. In this example, the system 300 includes the multiple switching regulator circuit 100 of FIG. 1. The circuit 100 in FIG. 3 is used to generate multiple regulated signals, which here represent multiple regulated voltages V$_{OUT1}$-V$_{OUTn}$.

The regulated signals are provided to different loads, which in this example represent different circuits 302a-302n. Each of the circuits 302a-302n could represent any suitable circuitry for performing any suitable function(s). Note that while a single regulated signal is provided to a single load in FIG. 3, this is for illustration only. Multiple regulated signals could be provided to a single load. Also, each switching regulator 102a-102n in the circuit 100 could be used to generate a separate regulated signal, and/or multiple switching regulators 102a-102n in the circuit 100 could be used to generate a single regulated signal.

The system 300 shown in FIG. 3 could be implemented in any suitable manner. For example, various components in the circuit 100 (such as the control units, output stages, one shot timers, and combination unit) could be integrated onto a single integrated circuit die. This integrated circuit die could then be electrically coupled to inductors 108a-108n, capacitors 110a-110n, and circuits 302a-302n.

Although FIG. 3 illustrates one example of a system 300 including a circuit for reducing crosstalk interference between integrated switching regulators, various changes may be made to FIG. 3. For example, the circuit 100 could be used in any larger device or system.

Figure 4:
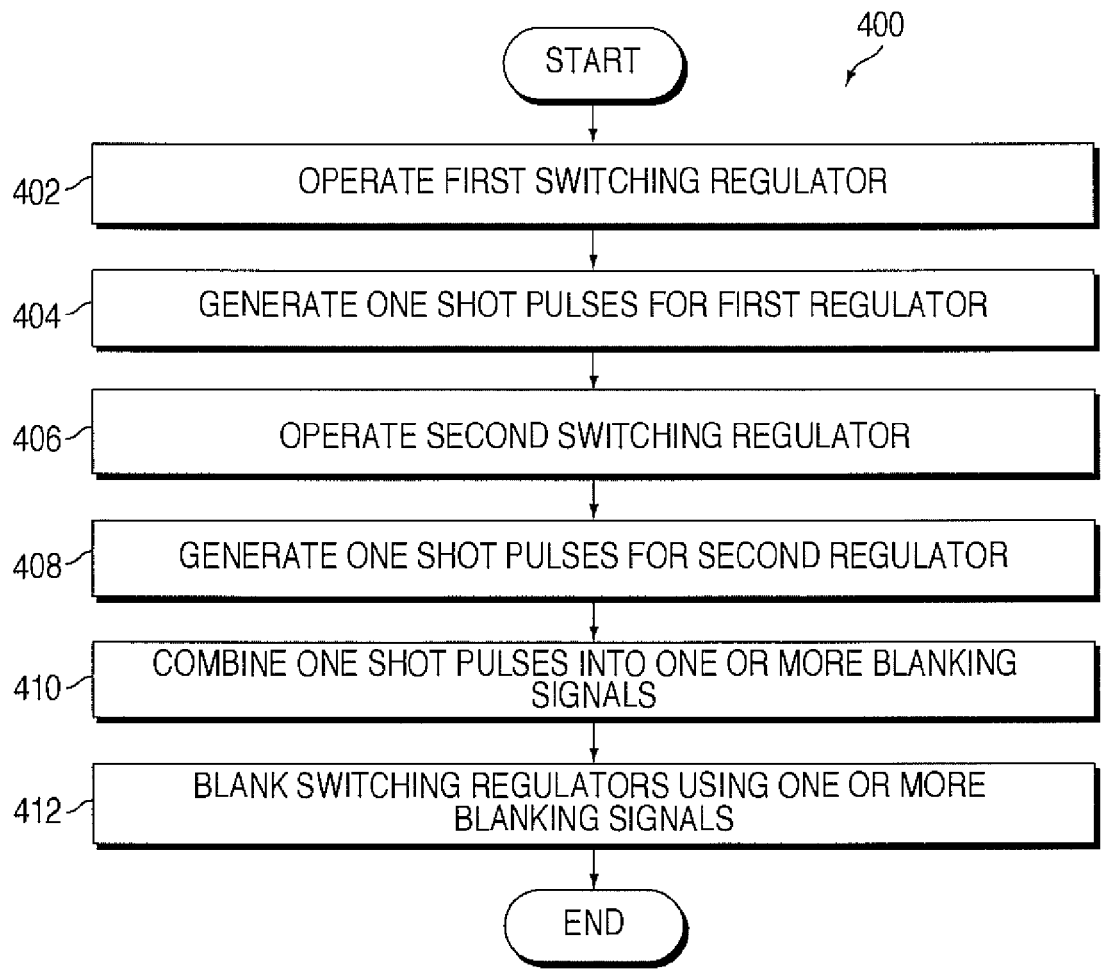
FIG. 4 illustrates an example method for reducing crosstalk interference between integrated switching regulators according to this disclosure.

FIG. 4 illustrates an example method 400 for reducing crosstalk interference between integrated switching regulators according to this disclosure. A first switching regulator is operated at step 402. This could include, for example, the control unit 104a generating a control signal $CTRL_1$ for an output stage 106a, which generates an output voltage $V_{OUT1}$. The control unit 104a could use the feedback signal $V_{FB1}$ to generate the control signal $CTRL_1$. During operation of the first switching regulator, one shot pulses are generated for the first switching regulator at step 404. This could include, for example, the one shot timer 112a generating short pulses for each rising and falling edge in the control signal $CTRL_1$.

A second switching regulator is operated at step 406. This could include, for example, the control unit 104n generating a control signal $CTRL_n$ for an output stage 106n, which generates an output voltage $V_{OUTn}$. The control unit 104n could use the feedback signal $V_{FBn}$ to generate the control signal $CTRL_n$. During operation of the second switching regulator, one shot pulses are generated for the second switching regulator at step 408. This could include, for example, the one shot timer 112n generating short pulses for each rising and falling edge in the control signal $CTRL_n$.

The one shot pulses are combined into one or more blanking signals at step 410. This could include, for example, the combination unit 114 combining the signals from the one shot timers 112a-112n into one or more blanking signals $BLANK_1$-$BLANK_n$. Each of the blanking signals $BLANK_1$-$BLANK_n$ may therefore contain all of the one shot pulses. The switching regulators are blanked using the one or more blanking signals at step 412. This could include, for example, the combination unit 114 providing the blanking signals $BLANK_1$-$BLANK_n$ to the control units 104a-104n. During pulses in the blanking signals $BLANK_1$-$BLANK_n$ the control units 104a-104n may pause operation or otherwise not attempt to modify their control signals $CTRL_1$-$CTRL_n$. In this way, each of the control units 104a-104n may not respond to transients caused by interference from its own output stage 106a-106n or to transients caused by interference from other output stages 106a-106n.

Although FIG. 4 illustrates one example of a method 400 for reducing crosstalk interference between integrated switching regulators, various changes may be made to FIG. 4. For example, while shown as a series of steps, various steps in FIG. 4 could overlap, occur in parallel, or occur in a different order. As a particular example, steps 402-404 may overlap with steps 406-408, and steps 410-412 could overlap with steps 402-404 and with steps 406-408. Also, while shown as involving two switching regulators, the method 400 could involve more than two switching regulators.

It may be advantageous to set forth definitions of certain words and phrases that have been used within this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
    generating at least one regulated output signal using multiple switching regulators;
    for each switching regulator, providing control signals to control selected operations of the switching regulator;
    for each switching regulator, outputting switching event signals for respective switching events;
    detecting switching event signals from the multiple switching regulators; and
    in response to the detection of a switching event signal from a switching regulator, blanking for a predetermined duration the provision of control signals in each of the multiple switching regulators.

2. The method of claim 1, further comprising:
    generating multiple first signals, each first signal comprising pulses identifying switching events associated with one of the switching regulators; and
    combining the first signals to generate at least one second signal.

3. The method of claim 2, wherein blanking the switching regulators comprises providing the at least one second signal to blanking inputs of the switching regulators.

4. The method of claim 2, wherein combining the first signals comprises performing one or more logical OR operations using the first signals.

5. The method of claim 2,
    wherein the first signal associated with at least one of the switching regulators comprises a pulse that is generated in response both to each rising edge and to each falling edge of the control signal in that switching regulator.

6. The method of claim 1, wherein blanking the switching regulators prevents each switching regulator from responding to transients caused by switching events in that switching regulator and to transients caused by switching events in at least one other switching regulator.

7. The method of claim 1, wherein generating the at least one regulated output signal comprises generating multiple regulated output voltages.

8. An apparatus comprising:
    multiple switching regulators configured to generate at least one regulated output signal; each switching regulator including
        control circuitry configured to provide control signals to control selected operations of the switching regulator; and
        event signaling circuitry configured to output switching event signals indicative of respective switching events; and
    a combination unit configured to provide blanking signals in response to the switching event signals;
    in each switching regulator, the control circuitry being configured to blank, in response to the blanking signals, the provision of at least some of the respective control signals for a predetermined duration.

9. The apparatus of claim 8, wherein:
    for at least one switching regulator, the event signaling circuitry comprises a one shot timer configured to generate a first signal comprising pulses that identify switching events associated with that switching regulator; and
    the combination unit is configured to combine the first signals to generate at least one second signal.

10. The apparatus of claim 9, wherein the combination unit is configured to provide the at least one second signal to blanking inputs of the switching regulators.

11. The apparatus of claim 9, wherein the combination unit comprises one or more logical OR gates configured to combine the pulses in the first signals.

12. The apparatus of claim 9, wherein:
the one shot timer in the at least one switching regulator is configured to generate a pulse in the first signal associated with that switching regulator in response both to each rising edge and to each falling edge of the control signal in that switching regulator.

13. The apparatus of claim 8, wherein the combination unit is configured to blank all of the switching regulators in response to each switching event associated with any of the switching regulators.

14. The apparatus of claim 8, wherein the switching regulators are configured to generate multiple regulated output voltages.

15. A system comprising:
one or more loads, each configured to operate using at least one regulated signal; and
multiple switching regulators configured to generate the at least one regulated signal; each switching regulator including
control circuitry configured to provide control signals to control selected operations of the switching regulator; and
event signaling circuitry configured to output switching event signals indicative of respective switching events;
a combination unit configured to provide blanking signals in response to the switching event signals;
in each switching regulator, the control circuitry being configured to blank, in response to the blanking signals, the provision of at least some of the respective control signals for a predetermined duration.

16. The system of claim 15, wherein:
for at least one switching regulator, the event signaling circuitry comprises a one shot timer configured to generate a first signal comprising pulses that identify switching events associated with that switching regulator; and
the combination unit is configured to combine the first signals to generate at least one second signal.

17. The system of claim 16, wherein the combination unit is configured to provide the at least one second signal to blanking inputs of the switching regulators.

18. The system of claim 16, wherein the combination unit comprises one or more logical OR gates configured to combine the pulses in the first signals.

19. The system of claim 16, wherein:
the one shot timer in the at least one switching regulator is configured to generate a pulse in the first signal associated with that switching regulator in response both to each rising edge and to each falling edge of the control signal in that switching regulator.

20. The system of claim 15, wherein the combination unit is configured to blank all of the switching regulators in response to each switching event associated with any of the switching regulators.

* * * * *